A. J. HALL.
SYSTEM OF CONTROL.
APPLICATION FILED FEB. 3, 1916.
1,306,537.
Patented June 10, 1919.
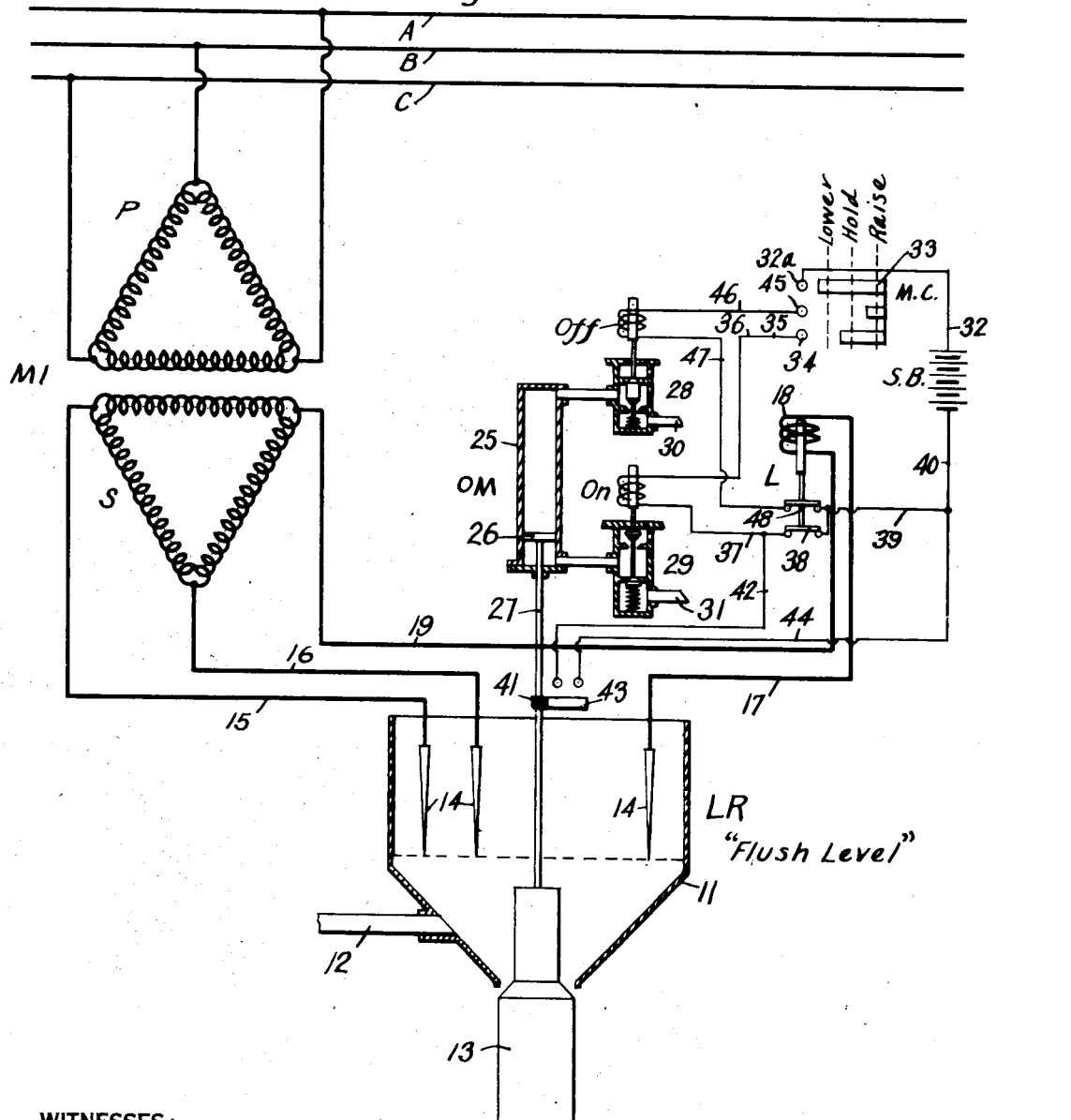

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,306,537.  Specification of Letters Patent.  Patented June 10, 1919.

Application filed February 3, 1916. Serial No. 75,957.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Systems of Control, of which the following is a specification.

My invention relates to systems of control and especially to certain automatic control features in the operation of electric railway motors and the like.

In the operation of electric railway vehicles, especially when relatively heavy loads are being hauled, the motor current may at times become dangerously, or at least undesirably, high, and the usual type of limit switch that is provided merely temporarily prevents further acceleration but does not decrease the current. In particular, assuming the case of a locomotive attached to the front of a heavy freight train and a secondary locomotive secured to the rear end thereof, if the operator of the head locomotive shuts off his power or sets the brakes and the operator of the rear locomotive does not happen to notice his rising ammeters, certain undesirable results, such as overheating of motors or the grinding out of "cups" in the rails by the slipping wheels, may occur before the power is shut off from the rear locomotive.

One object of my invention is to provide a system of the above-indicated class wherein the undesirable results mentioned are eliminated, and, in case of an undesirably heavy motor current, a governing translating device or resistor is reversely manipulated to automatically increase the circuit resistance and lower the motor current.

Another object of my invention is to provide a simple and reliable system of the character in question, wherein the above-mentioned reversed manipulation is arrested just prior to open-circuit conditions, whereby it is rendered impossible to open the motor circuit except by manual operation of the main controlling device to its "off" position, as hereinafter more fully described.

My invention may best be understood by reference to the accompanying drawing wherein Figure 1 is a diagrammatic view of an electric locomotive embodying a set of propelling motors to which my invention may be applied, and Fig. 2 is a diagrammatic view of a simplified system of control embodying my invention.

Referring to Fig. 1 of the drawing, the apparatus shown comprises a suitable locomotive cab 1 which is mounted upon a pair of appropriate trucks 2 and 3, a plurality of sets of driving motors M1 and M2, and M3 and M4, respectively, and a plurality of sets of driving mechanisms 4 and 5 of any suitable type for transmitting the torque of the driving motors to the corresponding sets of wheels 6 and 7, respectively, which are adapted to operate on rails 8, in accordance with customary practice.

Referring now to Fig. 2, the system shown comprises a plurality of three-phase supply-circuit conductors A, B, and C, respectively, one of the driving induction motors M1 of the locomotive that is shown in Fig. 1, which motor may embody a delta-connected primary winding P and a similarly-connected rotatable secondary winding S, although it will be understood that any other suitable type of induction motor windings, or in fact some entirely different type of the driving motor may be employed, if desired, a governing translating device, such as a liquid rheostat LR, for governing the acceleration of the induction motor M1, an operating mechanism OM for the liquid rheostat LR, a double-disk relay device L of the limit-switch type, for a purpose to be described and a suitable governing control system for the operating mechanism OM.

It will be understood that, whereas, for the sake of simplicity and clearness, I have shown only one motor, any suitable number of motors and liquid rheostats may be governed by one controller, in accordance with familiar principles.

The liquid rheostat LR may be of any well-known type and is here shown as comprising a suitable tank or compartment 11, an inlet passage or opening 12, a combined discharge and regulating valve 13 and a plurality of appropriate plates or electrodes 14 which are adapted for variable immersion in a suitable body of electrolyte. Inasmuch as the particular type of governing translating device that is employed is immaterial to my present invention, I do not deem it necessary to set forth any further description here, but reference may be had to my co-pending application, Serial No. 873,919, filed November 25, 1914, for a more extended description.

Two of the electrodes 14 are directly connected to terminals of the secondary induction motor winding S through conductors 15 and 16, respectively, while the remaining electrode 14 is connected through conductor 17, actuating coil 18 of the relay device L and conductor 19 to the remaining secondary winding terminal.

The operating mechanism OM is of a familiar fluid-pressure-actuated type and comprises a suitable operating cylinder 25 within which travels a piston 26 to which is secured a piston rod 27 that is adapted to actuate the regulating valve 13 of the liquid rheostat LR. A plurality of valves 28 and 29 are associated with the respective ends of the cylinder 25 and are adapted to admit fluid pressure from any suitable source through pipes or passages 30 and 31, respectively, to the cylinder 25, under conditions to be described.

The valve 28 is normally opened to admit fluid pressure to the upper end of the cylinder 25, and, when the valve is actuated by the energization of a governing coil marked "off", the valve is closed and fluid pressure is exhausted from the upper end of the cylinder 25. On the other hand, the valve 29 is normally closed to exclude fluid pressure from the lower end of the cylinder 25, and only when an actuating coil marked "on" is energized, is the valve actuated to admit fluid pressure to the cylinder 25. Consequently, the piston 26 is normally biased to its lowest position, and, upon the simultaneous energization of the "off" and "on" actuating coils, the unbalanced fluid-pressure condition effects the upward movement of the piston 26 to gradually raise the level of the electrolyte in the liquid rheostat LR and thus gradually decrease the resistance of the secondary induction motor winding circuit. To arrest the movement of the piston 26 at any desired point, it is merely necessary to deënergize the "off" actuating coil, when balanced fluid-pressure conditions obtain in the operating cylinder 25 and a positive stoppage of the piston 26 is effected. To cause the return of the piston 26 to its lowest position, the two actuating coils "off" and "on" are simultaneously deënergized, whereby fluid pressure is admitted to the upper portion of the cylinder and is exhausted from the lower portion thereof.

The auxiliary governing system for the operating mechanism OM may comprise a master controller MC that is adapted to occupy three positions marked "Lower", "Hold" and "Raise", that correspond to downward movement, stationary condition and upward movement of the piston 26, respectively; a suitable source of energy, such as a storage battery SB, for energizing the actuating coils "off" and "on", in accordance with the position of the master controller and certain inter-connections of the contact members of the relay device L and the actuating coils of the operating mechanism OM, as about to be set forth.

Assuming that it is desired to effect the acceleration of the induction motor M1, the master controller MC is first actuated to its position "Raise", whereupon the electrolyte in the liquid rheostat LR is admitted until the level indicated by the dotted line and marked "Flush level" is obtained, when the circuit of the secondary motor winding S, with the liquid rheostat LR is initially completed. For a more extended description of the operation just described and the preferred means, in addition to those herein illustrated, for effecting such operation, reference may be had to my co-pending application, Serial No. 876,484, filed December 10, 1914, patented Sept. 17, 1918, No. 1,278,917. However, the simplified structure and circuit connections that are shown in the drawing are believed to set forth my present invention in sufficiently full and exact terms so that no illustration or description of the preferred complete apparatus that is shown in the application referred to is believed to be required.

The initial governing-circuit connection is established from one terminal of the battery SB through conductor 32, control finger 32$^a$ and contact segment 33 of the master controller in its position "Raise", whence one circuit is completed through control finger 34, conductors 35 and 36, the actuating coil "on" of the valve 29, and conductor 37, one auxiliary contact disk 38 of the relay device L in its lower or operative position and conductor 39 to the opposite terminal of the battery SB.

It should be observed that, under "flush-level" conditions in the liquid rheostat LR, a switching device 41 that is rigidly and insulatedly secured to the piston rod 27, is included in a circuit that is completed from conductor 37 through conductor 42, contact member 43 of the switching device 41 and conductor 44 to the negative conductor 40. Thus, at "flush-level", the actuating coil "on" is independently energized and the auxiliary contact disk 38 of the relay device L is short-circuited, for a purpose to be set forth later.

Another circuit is simultaneously established from the contact segment 33 of the master controller through control finger 45, conductor 46, the actuating coil "off" of the valve 28, conductor 47 and auxiliary contact disk 48 of the relay device L, in its lower position, to the negative conductor 39. Since both the "off" and the "on" actuating coils are simultaneously energized, the piston 26 is actuated upwardly, as hereinbefore described, and the level of the electrolyte is gradually raised to effect corresponding acceleration of the induction motor M1.

However, if, at any time during the accelerating period, the motor current, by reason of the fact that the locomotive is climbing a grade, for example, should become undesirably high, then the relay device L, the actuating coil 18 of which is connected in series-circuit relation with one of the electrodes 14, is raised to interrupt the circuit between the pairs of conductors 37 and 39, and 47 and 39, respectively. Consequently, both the "off" and the "on" actuating coils are simultaneously deënergized, whereby the reversal of unbalanced fluid-pressure conditions automatically causes the piston 26 to return toward its lowest position, or, in other words, the "resistance-decreasing" operation of the mechanism OM is not merely arrested but the "resistance-increasing" operation is immediately effected to thus reduce the secondary-winding current of the induction motor and correspondingly decrease the primary winding current thereof.

It will, of course, be understood that, when the motor current has decreased to a normal or safe value, the relay device L will drop to its lower or operative position, and the acceleration of the induction motor will be continued. However, should conditions be such that the relay device L remains in its upper position until the electrolyte has been lowered to "flush-level", then the relay device and the operating mechanism are rendered temporarily inoperative, irrespective of motor current, just prior to open-circuit conditions, by reason of the short-circuiting of the relay device contact disk 38 and the independent energization of the actuating coil "on" of the valve 29 by the switching device 41, as hereinbefore described, whereby balanced pressure conditions obtain.

If the master controller is moved, at any time, to the intermediate position "Hold", the "off" coil is deënergized by the disengagement of contact segment 33 and control finger 45, thus arresting the movement of the operating mechanism. By actuating the controller to the "lower" position, both valve coils are deënergized and the mechanism is returned to the illustrated position. Complete discharge of the electrolyte may then be effected in the manner set forth in my last-mentioned co-pending application, or by any other suitable method. Thus, the automatic reversal of the operating mechanism may be effected with the controller in either the "raise" or the "hold" position.

It will be seen that I have provided a relatively simple and effective system for automatically decreasing motor current, dependent upon the electrical characteristics of the motor operation, that is, under predetermined abnormal accelerating conditions and for automatically arresting such decreasing action just prior to open-circuit conditions of the motor.

I do not wish to be restricted to the specific circuit connections or arrangement and location of parts herein set forth as various modifications thereof may be made without departing from the spirit and scope of my invention. I desire, therefore, that only such limitations shall be imposed as are indicated in the appended claims.

I claim as my invention:

1. In a system of control, the combination with a dynamo-electric machine and a variable governing device therefor, of means for varying said device to effect predetermined operation of said machine, and means dependent upon the current flow through the machine circuit and the position of said device for automatically reversing said device.

2. In a system of control, the combination with a dynamo-electric machine and a variable governing device therefor, of means for varying said device to effect acceleration of said machine, and means dependent upon the current flow through said machine and the position of said device for automatically reversing said device under various operating conditions.

3. In a system of control, the combination with an electric motor and a variable governing resistor therefor, of means for gradually decreasing the effective value of said resistor to effect acceleration of the motor, and means dependent upon both the electrical condition and the active mechanical amount of said resistor for automatically increasing the value of said resistor.

4. In a system of control, the combination with an electric motor and a variable governing resistor therefor, of an operating mechanism for decreasing or increasing the effective value of said resistor when moved in the one or the other direction, respectively, means for normally effecting the decreasing operation of said mechanism to accelerate the motor, and auxiliary means dependent upon the current flow through, and the active amount of said resistor for automatically effecting the increasing operation of said mechanism.

5. In a system of control, the combination with an electric motor and a variable governing resistor therefor, of an electrically controlled operating mechanism for decreasing or increasing the effective value of said resistor when moved in the one or the other direction, respectively, a controlling device for normally energizing said electrically controlled mechanism to gradually decrease the effective value of said resistor and accelerate said motor, and auxiliary switching means dependent upon the electrical condition of said resistor and the mechanical position of said mechanism for automatically deënergizing said mechanism to gradually increase the value of said resistor.

6. In a system of control, the combination with an electric motor, and a governing variable resistor therefor, of a fluid-pressure-actuated operating mechanism for decreasing or increasing the value of said resistor when moved in the one or the other direction, respectively, a controlling device for said mechanism for effecting the proper admission and release of fluid pressure to gradually decrease the value of said resistor and accelerate said motor, and auxiliary means dependent upon the electrical condition of said resistor for automatically effecting the proper admission and release of fluid pressure to gradually increase the value of said resistor under predetermined abnormal conditions.

7. In a system of control, the combination with an electric motor, and a governing variable resistor therefor, of an operating mechanism for decreasing or increasing the value of said resistor when moved in the one or the other direction, respectively, a plurality of actuating coils for said mechanism, a controlling device for normally energizing said coils to gradually decrease the value of said resistor and accelerate said motor, and a limit switch energized in accordance with the current traversing said resistor for automatically deenergizing said coils to gradually increase the value of said resistor under relatively heavy-current conditions while said mechanism occupies predetermined positions.

8. In a system of control, the combination with an electric motor, and a governing variable resistor therefor, of a fluid-pressure-actuated operating mechanism for decreasing or increasing the value of said resistor when moved in the one or the other direction, respectively, a plurality of governing coils for effecting the proper admission and release of fluid pressure to gradually decrease the value of said resistor and accelerate said motor, and a limit switch actuated in accordance with the current traversing said resistor for automatically effecting the proper admission and release of fluid pressure to gradually increase the value of said resistor under relatively heavy-current conditions.

9. In a system of control, the combination with an electric motor, and a governing variable resistor therefor, of an operating mechanism for decreasing or increasing the value of said resistor when moved in the one or the other direction, respectively, said mechanism embodying a movable piston and a coöperating cylinder, a valve normally opened to admit fluid pressure to one end of said cylinder, a second valve normally closed to exclude fluid pressure from the other end of the cylinder, a plurality of governing coils for said valves, a controlling device for normally energizing said coils to effect "decreasing" operation of said mechanism, and a limit switch actuated in accordance with the current traversing said resistor for automatically deënergizing said coils to effect "increasing" operation of said mechanism under relatively heavy-current conditions.

10. In a system of control, the combination with a dynamo-electric machine, and a governing variable translating device therefor, of means for varying said device to effect acceleration of said machine, means dependent upon the electrical condition of said device for automatically reversing the variation of said device under predetermined conditions, and means for automatically arresting said reversal under other predetermined conditions.

11. In a system of control, the combination with an electric motor, and a governing variable resistor therefor, of means for gradually decreasing the value of said resistor to effect acceleration of the motor, means dependent upon the electrical condition of said resistor for automatically increasing the value of said resistor under predetermined conditions, and means for subsequently automatically arresting said increasing action irrespective of the electrical condition of said resistor.

12. In a system of control, the combination with an electric motor, and a governing variable resistor therefor, of means for decreasing or increasing the value of said resistor when moved in the one or the other direction, respectively, means for normally effecting the "decreasing" operation of said mechanism to accelerate the motor, auxiliary means dependent upon the electrical condition of said resistor for automatically effecting the "increasing" operation of said mechanism under predetermined abnormal conditions, and means for automatically preventing subsequent open-circuit conditions.

13. In a system of control, the combination with an electric motor, and a governing variable resistor therefor, of a fluid-pressure-actuated operating mechanism for decreasing or increasing the value of said resistor when moved in the one or the other direction, respectively, a controlling device for said mechanism for effecting the proper admission and release of fluid pressure to gradually decrease the value of said resistor and accelerate said motor, auxiliary means dependent upon the electrical condition of said resistor for automatically effecting the proper admission and release of fluid pressure to gradually increase the value of said resistor under predetermined abnormal conditions, and means independent of the condition of said resistor for automatically preventing subsequent open-circuit conditions.

14. In a system of control, the combination with an electric motor, and a governing variable resistor therefor, of an operating mechanism for decreasing or increasing the value of said resistor when moved in the one or the other direction, respectively, a plurality of actuating coils for said mechanism, a controlling device for normally energizing said coils to gradually decrease the value of said resistor and accelerate said motor, a limit switch energized in accordance with the current traversing said resistor for automatically deënergizing said coils to gradually increase the value of said resistor under relatively heavy-current conditions, and switching means actuated just prior to open-circuit conditions for rendering only one of said coils inoperative and thus arresting the movement of said mechanism.

15. In a system of control, the combination with an electric motor, and a governing variable resistor therefor, of a fluid-pressure-actuated operating mechanism for decreasing or increasing the value of said resistor when moved in the one or the other direction, respectively, a plurality of governing coils for effecting the proper admission and release of fluid pressure to gradually decrease the value of said resistor and accelerate said motor, a limit switch actuated in accordance with the current traversing said resistor for automatically effecting the proper admission and release of fluid pressure to gradually increase the value of said resistor under relatively heavy current conditions, and switching means actuated just prior to open-circuit conditions for energizing one of said coils and rendering said limit switch inoperative and thus arresting the movement of said mechanism.

16. In a system of control, the combination with an electric motor, and a governing variable resistor therefor, of an operating mechanism for decreasing or increasing the value of said resistor when moved in the one or the other direction, respectively, said mechanism embodying a movable piston and a coöperating cylinder, a valve normally opened to admit fluid pressure to one end of said cylinder, a second valve normally closed to exclude fluid pressure from the other end of the cylinder, a plurality of governing coils for said valves, a controlling device for normally energizing said coils to effect "decreasing" operation of said mechanism, a limit switch actuated in accordance with the current traversing said resistor for automatically deënergizing said coils to effect "increasing" operation of said mechanism under relatively heavy current conditions, and switching means movable with said piston for independently energizing the actuating coil of said second valve and short-circuiting certain of the limit-switch contact members just prior to open-circuit conditions, whereby balanced-pressure conditions obtain in said cylinder and movement of said mechanism is arrested.

In testimony whereof, I have hereunto subscribed my name this 28th day of Jan. 1916.

ARTHUR J. HALL.